Figure 1:
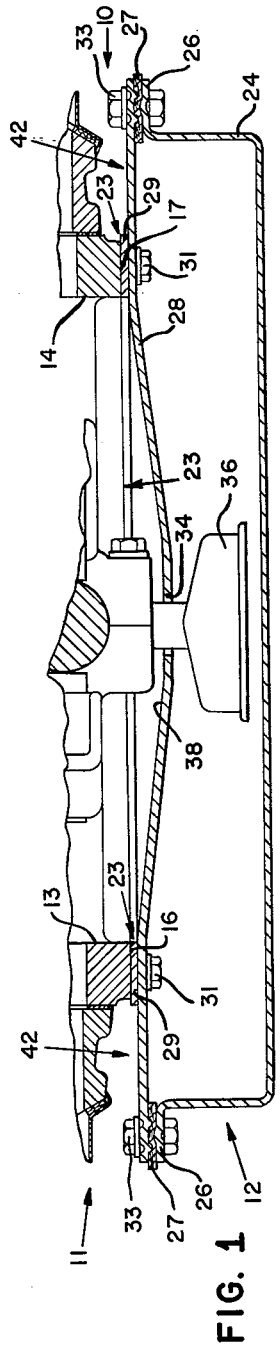

Aug. 6, 1963  H. J. BOOTH ETAL  3,100,028
LUBRICANT SUMP
Filed March 14, 1961  2 Sheets-Sheet 1

HARVEY J. BOOTH
ROBERT P. ERNEST
JAMES W. FOSTEY
INVENTOR.

BY John C. Faulkner
Thomas H. Oster
ATTORNEYS

HARVEY J. BOOTH
ROBERT P. ERNEST
JAMES W. FOSTEY
*INVENTOR.*

BY *John B. Faulkner*
*Thomas H. Oster*
ATTORNEYS

United States Patent Office 3,100,028
Patented Aug. 6, 1963

3,100,028
LUBRICANT SUMP
Harvey J. Booth, Grosse Ile, Robert P. Ernest, Detroit, and James W. Fostey, Dearborn, Mich., assignors to Ford Motor Company, Dearborn, Mich., a corporation of Delaware
Filed Mar. 14, 1961, Ser. No. 95,614
6 Claims. (Cl. 184—106)

This invention relates to a lubricant sump and more particularly to a lubricant sump which is shallow in depth and large in volume.

The trend in automotive vehicle design, for example, for many years has been toward compactness in both the vehicle and its component parts. Roof and hood lines have been substantially lowered and the underbody clearance space decreased. By virtue of this trend, it has been necessary to reduce the vertical height of some of the components such as the engine, while at the same time maintaining a maximum road clearance. This presents a considerable problem, particularly for the in-line engines when the engine bore and stroke and even horsepower requirements remain the same or are increased.

The air cleaner, carburetor and manifold have all been changed extensively to reduce engine height. Even the lubricant sump of which the oil pan is a part has been revised. In recent times in-line engines have been further modified by arranging the cylinders at an angle to the vertical axis, and also by tilting the engine on its side. In both instances some vertical height is removed.

Because the oil volume required by the engine is fixed, attempts to revise the oil pan are somewhat limited. For example, one vehicle manufacturer provides a cast oil pan which is bulged outwardly at the lowermost portion. Most manufacturers nest their engines quite close to the suspension and steering linkage parts. In these instances the forward portion of the oil pan is generally scalloped and the rear portion drops below the interfering mechanism to provide the necessary sump. This provision is also limited in its application as the road clearance may be encroached upon by the lowermost portion of the oil pan.

This invention is directed to a new and novel arrangement of a lubricant sump which may be used with all mechanisms. It is, therefore, an object of this invention to provide a lubricant sump which requires a minimum of depth space.

It is another object of this invention to provide a lubricant sump for a mechanism in which the lubricant sump is relatively shallow in depth and which is relatively large in volume.

It is still another object of this invention to provide a lubricant sump for a mechanism in which the sump is relatively shallow and which extends outwardly of its attachment to the mechanism.

Still another object of this invention is to provide a lubricant sump simple in construction, capable of easy manufacture and assembly, dependable in operation, and relatively low in cost.

Figure 2:
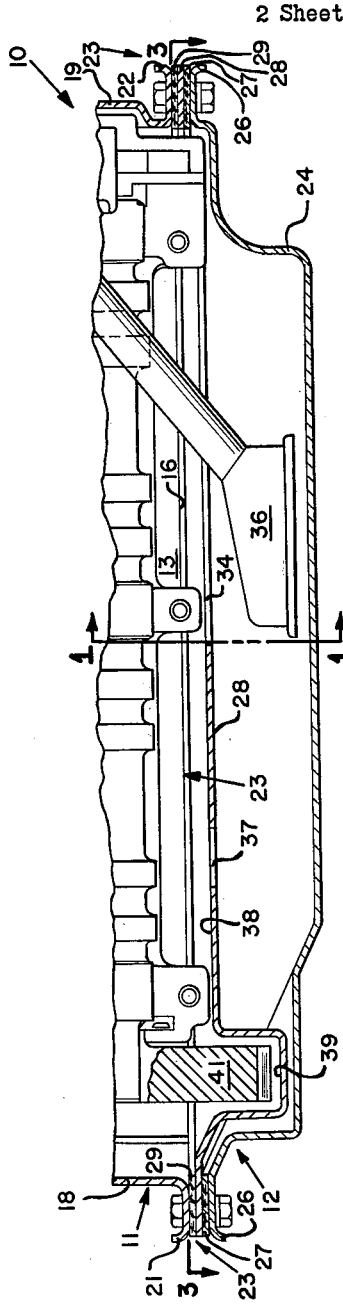
Figure 3:
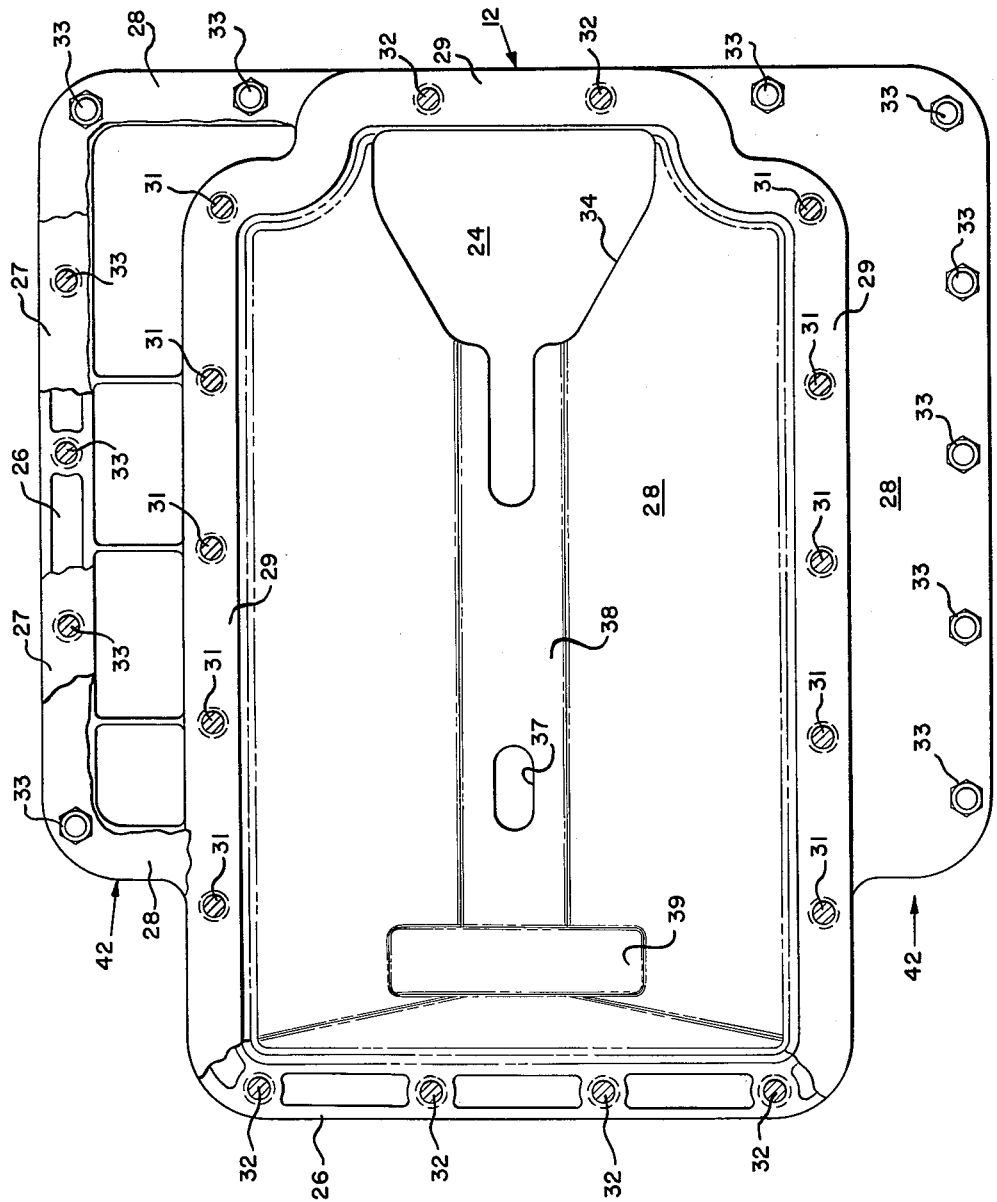

Other objects and advantages of this invention will become more apparent when considered in connection with the accompanying drawings, wherein:

FIGURE 1 is a fragmentary cross-sectional view of an internal combustion engine embodying the invention and taken on the plane indicated by the line 1—1 of FIGURE 2, and FIGURE 2 is a fragmentary longitudinal sectional view taken of the internal combustion engine shown in FIGURE 1, and FIGURE 3 is a horizontal view taken on the plane indicated by the line 3—3 of FIGURE 2.

Referring now to the drawings, the crankcase or lower portion of a horizontally opposed internal combustion engine is indicated generally at 10. Crankcase 10 is made up of an engine frame 11 and a lubricant sump 12.

Engine frame 11 is comprised of a pair of cylinder blocks 13 and 14 which terminate in attachment flanges 16 and 17. Each of the attachment flanges 16 and 17 is disposed on the side of the engine frame 11 and on each side of a vertical plane that includes the longitudinal axis of the internal combustion engine. Front and rear covers 18 and 19 are secured to cylinder blocks 13 and 14 (not shown) and likewise terminate in attachment flanges 21 and 22. The attachment flanges 16, 17, 21 and 22 together define a face which is indicated generally by the arrows 23.

Lubricant sump 12 is comprised of a lubricant or oil pan 24 which is provided with the usual peripheral attachment flange 26. A gasket 27 is disposed between the attachment flange 26 and a baffle 28. An additional gasket 29 is disposed between the face 23 and the baffle 28. Bolts 31 secure the baffle 28 to the attachment flanges 16 and 17. Bolts 32 secure the attachment flange 26 of the oil pan 24, gasket 27 and the baffle 28 to the front and rear cover flanges 21 and 22. Bolts 33 secure the attachment flange 26 of the lubricant pan 24 and the gasket 27 to the baffle 28.

Baffle 28 is provided with a longitudinal extending trough-like depression 38 inwardly of its attachment to the face 23. An enlarged opening 34 is provided at one end of the depression 38 through which the oil pump pick-up 36 extends from its attachment to the crankcase 10. An additional drain opening 37 may be provided also in the depression 38 for the draining of the lubricant and the passing of the lubricant through the baffle 28 into the lubricant pan 24.

Forwardly of the opening 37, baffle 28 may be provided with an arcuate depression 39 which extends downwardly into the confines of the lubricant pan 24 and is provided for the purpose of allowing camshaft gear 41 to rotate without contacting and agitating the lubricant contained in the lubricant pan 24. Baffle 28 prevents the lubricant from sloshing into the parts of the internal combustion engine and becoming contaminated with air.

The lubricant sump 12 therefore extends laterally outwardly of the attachment to the face 23 to provide the necessary volume. Although this outward extension of the sump, which is indicated at 42, is located on each side of the engine, it is also possible to have this extension located on one side only, on part of one side, on both sides as is shown, forwardly of the engine, rearwardly of the engine, on all sides, or any combination thereof.

The invention is not intended to be used specifically for internal combustion engines and other reciprocating mechanisms but may be used for any mechanism which has a face to which a shallow type full volume lubricant sump is required. An installation of this type is particularly adaptable to automatic transmission devices.

It will be understood that the invention is not to be limited to the exact construction shown and described, but that various changes and modifications may be made without departing from the spirit and scope of the invention as defined in the appended claims.

We claim:
1. A lubricant sump for attachment to a mechanism having a horizontally disposed lubricant return opening including, a baffle covering at least a portion of said opening and extending a substantial horizontal distance away from said opening, a lubricant pan enclosing at least the remaining portion of said opening, and means operatively securing said baffle and said lubricant pan to said mechanism whereby a lubricant-tight assembly is provided.

2. A lubricant sump for attachment to a mechanism having a horizontally disposed lubricant return opening including, a baffle covering at least a portion of said opening and extending a substantial horizontal distance away from said opening, a lubricant pan enclosing at least the remaining portion of said opening and extending in part a substantial horizontal distance away from said opening, and means operatively securing said baffle and said lubricant pan to said mechanism whereby a lubricant-tight assembly is provided.

3. A lubricant sump for attachment to a mechanism having a horizontally disposed lubricant return opening including, a baffle covering at least a portion of said opening and extending a substantial horizontal distance away from said opening, a lubricant pan enclosing at least the remaining portion of said opening, means securing said baffle to said mechanism, means securing a part of said lubricant pan to said baffle, and means securing a further part of said lubricant pan to said mechanism whereby a lubricant-tight assembly is provided.

4. A lubricant sump for attachment to a mechanism having a horizontally disposed lubricant return opening including, a baffle covering at least a portion of said opening and having a part extending a substantial horizontal distance away from said opening, a lubricant pan enclosing at least the remaining portion of said opening and extending in part a substantial distance from said opening coextensive horizontally with said part of said baffle, and means operatively securing said lubricant pan and said baffle to said mechanism whereby a lubricant-tight assembly is provided.

5. A lubricant sump for attachment to a mechanism having a horizontally disposed lubricant return opening including, a baffle covering at least a portion of said opening and having a part extending a substantial horizontal distance away from said opening, a lubricant pan enclosing at least the remaining portion of said opening and having a part extending a substantial distance from said opening coextensive horizontally with said part of said baffle, means securing said baffle to said mechanism, means securing said parts of the baffle and the lubricant pan together, and means securing said lubricant pan to said mechanism whereby an oil-tight assembly is provided.

6. In combination, a reciprocating mechanism comprising a frame, a horizontally disposed lubricant opening in said frame defined by two sets of opposing faces, a baffle covering at least a portion of said opening and extending a substantial horizontal distance away from one of said sets of opposing faces on each side thereof, means securing said baffle to said one of said sets of opposing faces, a lubricant pan enclosing at least the remaining portion of said opening and extending in part a substantial distance away from said one of said sets of opposing faces coextensive horizontally with said baffle, means securing said lubricant pan to said baffle at positions spaced from said one of said sets of opposing faces, and means securing said lubricant pan to the other of said sets of opposing faces whereby a lubricant-tight assembly is provided.

References Cited in the file of this patent

UNITED STATES PATENTS

| | | |
|---|---|---|
| 904,132 | Johnston | Nov. 17, 1908 |
| 1,447,788 | Kirkham | Mar. 6, 1923 |
| 1,642,494 | Hartzell | Sept. 13, 1927 |
| 1,713,872 | Hunt | May 21, 1929 |
| 2,172,147 | Smith | Sept. 5, 1939 |
| 2,357,522 | Kelley | Sept. 5, 1944 |